United States Patent
Frommhold et al.

(10) Patent No.: US 10,872,463 B2
(45) Date of Patent: Dec. 22, 2020

(54) DEPTH-COMPRESSED REPRESENTATION FOR 3D VIRTUAL SCENE

(71) Applicant: Microsoft Technology Licensing, LLC, Redmond, WA (US)

(72) Inventors: Dag Birger Frommhold, Metzingen (DE); Pavlos Mavridis, Reutlingen (DE); Benjamin Markus Thaut, Stuttgart (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/372,242

(22) Filed: Apr. 1, 2019

(65) Prior Publication Data

US 2020/0312015 A1 Oct. 1, 2020

(51) Int. Cl.
*G06T 15/40* (2011.01)
*G06K 9/00* (2006.01)
*H04L 29/06* (2006.01)

(52) U.S. Cl.
CPC .......... *G06T 15/40* (2013.01); *G06K 9/00624* (2013.01); *H04L 67/38* (2013.01); *G06T 2210/08* (2013.01); *G06T 2210/12* (2013.01); *G06T 2215/16* (2013.01)

(58) Field of Classification Search
CPC . G06T 15/40; G06T 2210/08; G06T 2215/16; G06T 2210/12; G06K 9/00624; H04L 67/38
See application file for complete search history.

(56) References Cited

U.S. PATENT DOCUMENTS

| | | | |
|---|---|---|---|
| 2010/0215251 A1* | 8/2010 | Klein Gunnewiek | H04N 13/128 382/154 |
| 2016/0267717 A1* | 9/2016 | Bar-Zeev | G06T 7/70 |
| 2017/0115488 A1 | 4/2017 | Ambrus et al. | |
| 2019/0141339 A1* | 5/2019 | Madajczak | G06T 15/005 |
| 2020/0098140 A1* | 3/2020 | Jagnow | G06T 15/40 |

FOREIGN PATENT DOCUMENTS

WO    2013155217 A1    10/2013

OTHER PUBLICATIONS

"International Search Report and Written Opinion Issued in PCT Application No. PCT/US20/020583", dated May 19, 2020, 10 Pages.

* cited by examiner

*Primary Examiner* — Diane M Wills
(74) *Attorney, Agent, or Firm* — Alleman Hall Creasman & Tuttle LLP

(57) ABSTRACT

A method for compressing depth information for a three-dimensional virtual scene includes, at a computing device, recognizing a three-dimensional virtual scene including one or more locally-maintained virtual objects. Positioning information for one or more remotely-maintained virtual objects to be included in the three-dimensional virtual scene are received from a remote device. For a virtual view of the three-dimensional virtual scene having a virtual perspective, different portions of the virtual view are classified as belonging to one of a plurality of different occlusion classes, each of the plurality of different occlusion classes specifying an occlusion relationship between locally-maintained virtual objects and remotely-maintained virtual objects in the virtual view. A depth-compressed representation indicating the occlusion class for each of the different portions of the virtual view is output to the remote device.

20 Claims, 9 Drawing Sheets

300

```
┌─────────────────────────────────────────────────────────────┐
│ RECOGNIZE A THREE-DIMENSIONAL VIRTUAL SCENE INCLUDING ONE   │
│        OR MORE LOCALLY-MAINTAINED VIRTUAL OBJECTS           │
│                                                         302 │
└─────────────────────────────────────────────────────────────┘
                              ↓
┌─────────────────────────────────────────────────────────────┐
│   RECEIVE POSITIONING INFORMATION FOR ONE OR MORE REMOTELY- │
│                 MAINTAINED VIRTUAL OBJECTS                  │
│                                                         304 │
└─────────────────────────────────────────────────────────────┘
                              ↓
┌─────────────────────────────────────────────────────────────┐
│  FOR A VIRTUAL VIEW OF THE THREE-DIMENSIONAL VIRTUAL SCENE, │
│    CLASSIFY DIFFERENT PORTIONS OF THE VIRTUAL VIEW AS       │
│  BELONGING TO ONE OF A PLURALITY OF DIFFERENT OCCLUSION     │
│                          CLASSES                            │
│                                                         306 │
└─────────────────────────────────────────────────────────────┘
                              ↓
┌─────────────────────────────────────────────────────────────┐
│   OUTPUT A DETPH-COMPRESSED REPRESENTATION OF THE VIRTUAL   │
│                            VIEW                             │
│                                                         308 │
└─────────────────────────────────────────────────────────────┘
```

FIG. 3

DEPTH-COMPRESSED REPRESENTATION FOR 3D VIRTUAL SCENE

BACKGROUND

A variety of data compression techniques can be used for compressing digital files, such as digital images and videos. Use of compression can reduce the amount of storage space required to store a particular digital file on a computing device, as well as reduce the amount of bandwidth necessary to transmit the digital file from one device to another.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for compressing depth information for a three-dimensional virtual scene includes, at a computing device, recognizing a three-dimensional virtual scene including one or more locally-maintained virtual objects. Positioning information for one or more remotely-maintained virtual objects to be included in the three-dimensional virtual scene are received from a remote device. For a virtual view of the three-dimensional virtual scene having a virtual perspective, different portions of the virtual view are classified as belonging to one of a plurality of different occlusion classes, each of the plurality of different occlusion classes specifying an occlusion relationship between locally-maintained virtual objects and remotely-maintained virtual objects in the virtual view. A depth-compressed representation indicating the occlusion class for each of the different portions of the virtual view is output to the remote device.

BRIEF DESCRIPTION OF THE DRAWINGS

FIG. 3 illustrates an example method for compressing depth information for a three-dimensional virtual scene.

DETAILED DESCRIPTION

Computing devices may render three-dimensional (3D) virtual imagery for a variety of different purposes. For instance, augmented/virtual reality devices may render and display 3D virtual objects such that they appear to physically exist in a user's real or virtual surroundings. Similarly, 3D virtual imagery may be rendered in video games, used to visualize three-dimensional datasets (e.g., in medical applications or scientific research applications), view three-dimensional models (e.g., in product design), etc. In general, this often involves one or more virtual objects being presented in a 3D space, which may correspond to a real-world environment (e.g., in augmented reality settings), or a fully-virtual space.

Figure 1:
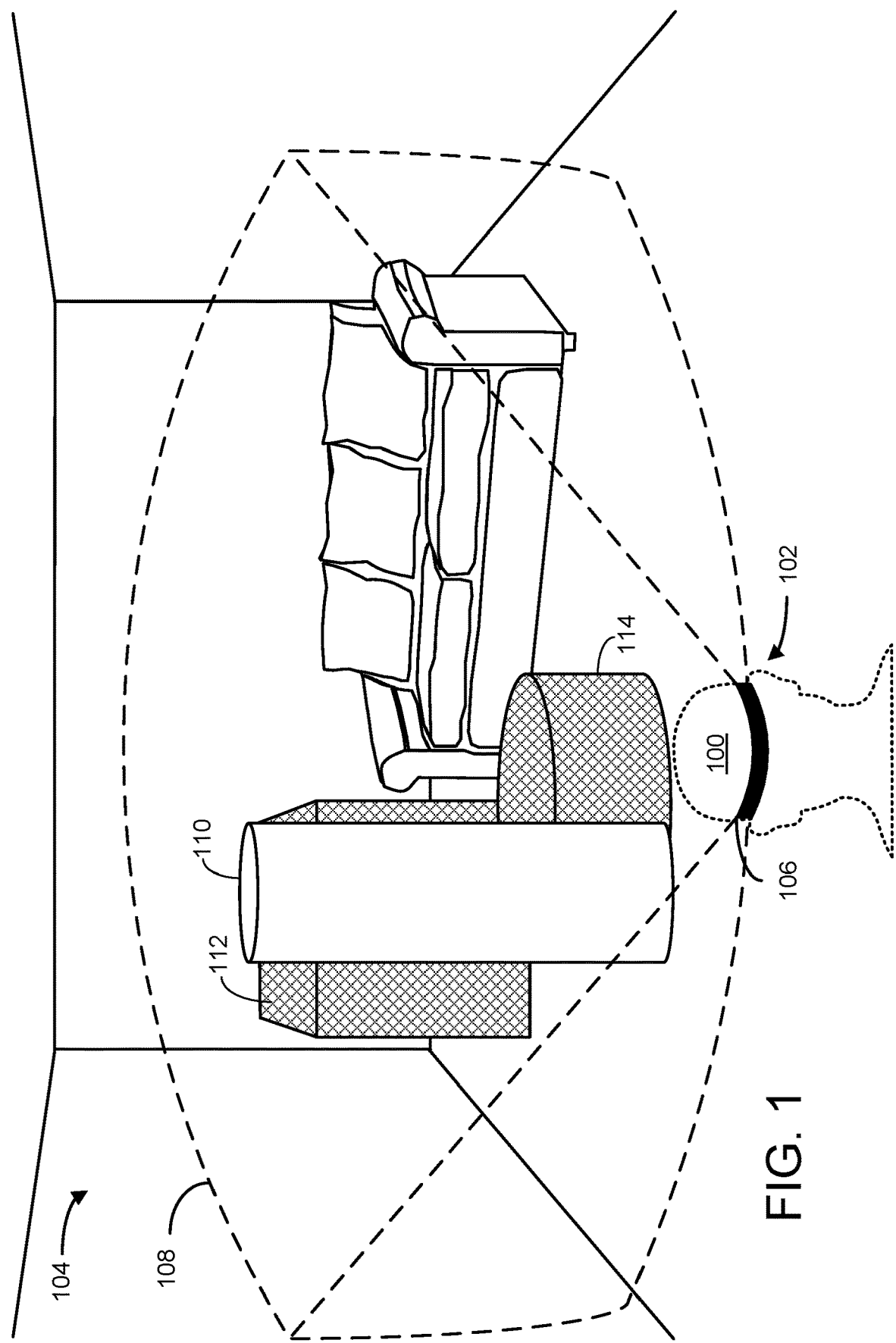
FIG. 1 schematically illustrates display of virtual objects.

This is illustrated in FIG. 1, which shows a user 100 with a head-mounted display device (HMD) in a real-world environment 104. Via a near-eye display 106 of the HMD, user 100 has a field-of-view 108, in which the user can see virtual objects 110, 112, and 114 displayed by HMD 102 as part of an augmented reality experience.

However, frame-by-frame rendering and tracking of virtual objects can be taxing on processing resources, thermal characteristics, power consumption, and/or battery life of a computing device. This is exacerbated when virtual objects are relatively complicated (e.g., comprised of a relatively large number of individual polygons or vertices), and/or when a relatively large number of different virtual objects are rendered in the same 3D virtual scene. Rendering and display of such relatively complicated scenes may require the HMD to, for each frame, calculate how each virtual object should be displayed to account for object movements, observer perspective changes, lighting effects, object-to-object occlusions (e.g., between different virtual objects and/or a mix of real and virtual objects), etc.

To this end, rendering of virtual objects may in some cases be divided between two or more different computing devices. For example, an HMD (or other suitable computing device) may present a 3D virtual scene including one or more locally-maintained virtual objects that are rendered and updated by the HMD, as well as one or more remotely-maintained virtual objects, the processing and rendering of which may be partially or entirely outsourced to a remote device. It will be understood, however, that the depth information compression techniques described herein may be applied in any scenario in which two or more computing devices contribute to the same 3D virtual scene, such as in 3D videoconferencing applications, collaborative virtual experiences, and/or other suitable settings.

Remote rendering is also illustrated in FIG. 1. Specifically, virtual object 110 is maintained by the HMD, meaning substantially all of the calculations involved with displaying and maintaining virtual object 110 are performed by the HMD. By contrast, virtual objects 112 and 114 are maintained by a remote computing device, such as a remote server, which may perform at least some of the processing tasks associated with rendering frame-by-frame representations of virtual objects 112 and 114. This is indicated by the fill pattern applied to virtual objects 112 and 114 in FIG. 1, as well as other figures discussed herein. The remote device may optionally have greater processing resources than the HMD, potentially allowing significantly more complicated virtual objects and 3D virtual scenes to be rendered than would ordinarily be possible using the HMD alone. In some scenarios, user experiences may be enhanced by locally-maintaining only the most prominent or important virtual objects, and using relatively more local resources to render these virtual objects with less latency at higher resolutions, frame rates, bit depths, and/or other quality parameters, while still allowing a large number of other virtual objects to be included, albeit with potentially greater latency and/or lower quality.

Figure 2A:
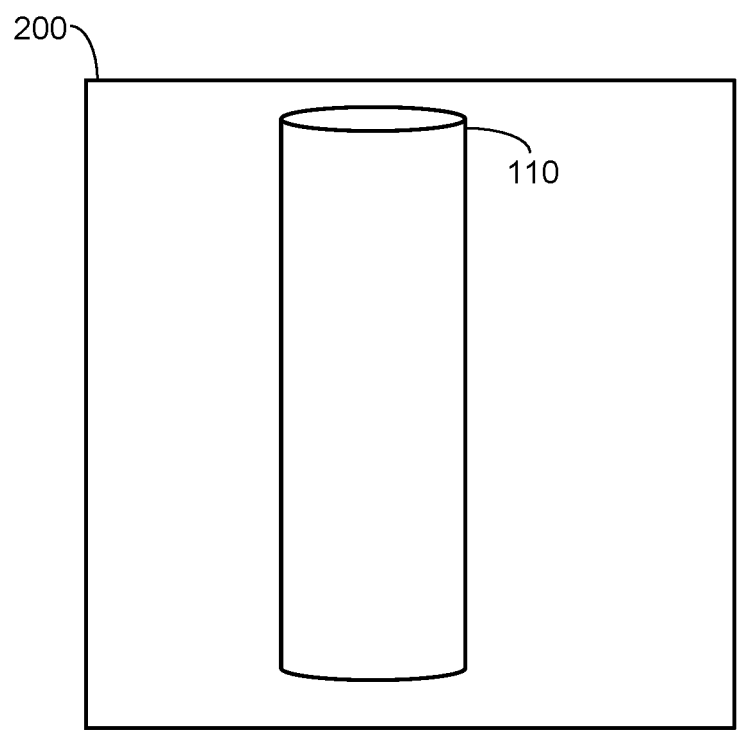
FIGS. 2A and 2B schematically illustrate display of locally-maintained and remotely-maintained virtual objects.
Figure 2B:
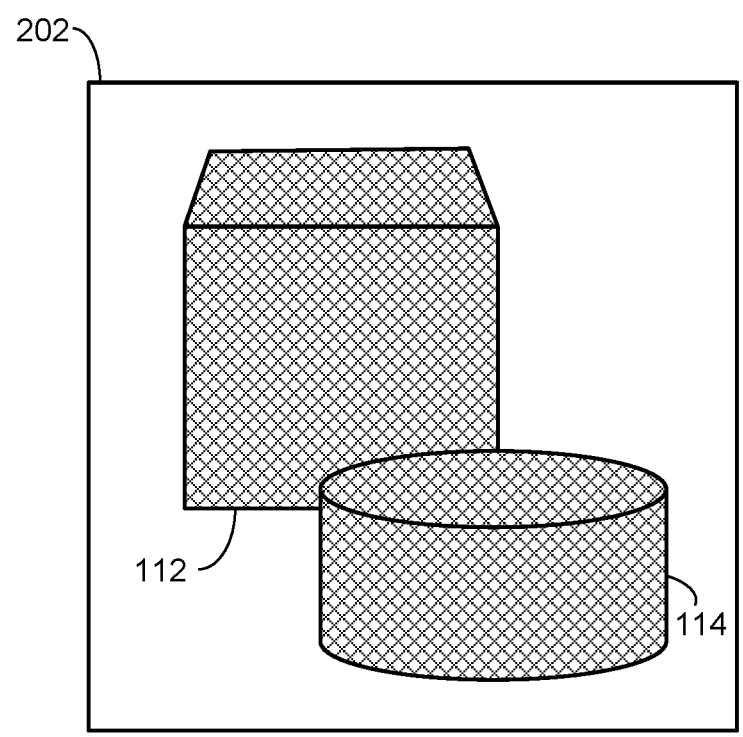

To achieve this, each device contributing to the 3D virtual scene (e.g., the HMD and remote server) may maintain separate instances of the 3D virtual scene that are populated with the virtual objects maintained by each separate device. For instance, FIG. 2A shows a particular instance 200 of a 3D virtual scene maintained by the HMD, in which only virtual object 110 is visible. Similarly, FIG. 2B shows a different instance 202 of the 3D virtual scene maintained by the remote device, in which virtual objects 112 and 114 are present, although virtual object 110 is absent.

To produce the combined 3D virtual scene displayed to user 100 in FIG. 1, in which virtual objects 110, 112, and 114 are present, the remote device may send some representation of virtual objects 112 and 114 to the HMD, which may then perform depth-aware compositing to produce a combined scene. Typically, the representation of virtual objects 112 and 114 will include some information regarding the 3D positions of these virtual objects in the 3D virtual scene, which may be used to ensure that virtual objects 112 and 114 have appropriate spatial relationships with respect to virtual object 110.

For instance, this representation may take the form of a virtual view of the 3D virtual scene from a virtual perspective (e.g., corresponding to the current pose of the HMD). In one example, the virtual view may specify depth values for each virtual object maintained by the device (e.g., at each of a plurality of pixels of a depth image). When paired with corresponding depth values for virtual objects maintained by the other device, occlusion relationships between locally and remotely-maintained virtual objects may be calculated. In FIG. 1, virtual object 110 occludes portions of virtual objects 112 and 114, as virtual object 110 has a virtual position that is closer to user 100 than virtual objects 112 and 114.

Unfortunately, while a variety of effective compression techniques already exist for encoding information associated with the visual appearance of virtual objects (e.g., color and/or lighting values for each pixel), these existing techniques are less effective at encoding depth information. For instance, compression techniques applied to typical color images and videos, like chroma subsampling, which is often used in many codecs (e.g., JPEG, 6264, HEVC) often take advantage of unique traits of the human visual system (such as the low sensitivity to high frequency color variations) to reduce the amount of data used, which is typically not applicable to depth information. Furthermore, compression techniques used for color images and videos generally encode a smaller range of values than what is typically required for depth information. Therefore, directly using such previous methods for encoding depth values typically gives inconsistent and sub-optimal results. However, because specialized encoding and decoding hardware for these pre-existing compression techniques is often built into consumer computing devices, such hardware can be leveraged using the techniques described herein to more efficiently compress depth information.

Furthermore, techniques exist for lossless compression of depth information, and are often used in graphics processing units (GPUs) to reduce bandwidth requirements during rendering. However, the compression ratio achieved by such techniques is on the order of 5:1 for complex scenes. By contrast, the depth information compression techniques described herein can achieve compression ratios on the order of 50:1, significantly reducing the amount of storage space and network bandwidth associated with storage and transmission of depth information.

Accordingly, the present disclosure is directed to techniques for compressing depth information for a 3D virtual scene. As one example, a computing device (e.g., server) may maintain one or more locally-maintained virtual objects (e.g., objects 112 and 114) in a 3D virtual scene. The computing device may receive, from a remote device such as HMD 102, positioning information for one or more remotely-maintained virtual objects (e.g., object 110). Based on this, the computing device may generate a virtual view of a combined version of the 3D virtual scene (e.g., the virtual view corresponding to an observer's viewpoint), assign different occlusion classes to different portions of the virtual view based on occlusion relationships between locally and remotely-maintained virtual objects, and output a depth-compressed representation of the virtual view to the remote device. In some cases, different amounts of information may be included for different portions of the virtual view depending on the occlusion class. Thus, relatively less information may be included for portions of the virtual view having relatively simple occlusion relationships, or no occlusions at all, while more information may be included for more complicated cases. The remote device (e.g., HMD) may then use this depth-compressed representation to display a combined version of the 3D virtual scene, in which the locally and remotely-maintained virtual objects are visible and occlude each other in consistent and expected ways. In this manner, relatively more complicated 3D virtual scenes may be displayed than would be possible using a single device, while reducing the network bandwidth used between the two devices.

FIG. 3 illustrates an example method 300 for compressing depth information for 3D virtual scenes. In some scenarios, method 300 is performed by a computing device configured to assist a virtual reality device (e.g., HMD) display a three-dimensional virtual scene. Method 300 may be implemented on a suitable computing device having a sufficient hardware configuration regardless of form factor. As examples, method 300 may be implemented on a server, desktop computer, laptop computer, mobile computing device (e.g., smartphone, tablet), wearable device, another virtual/augmented reality computing device, media center, etc. In one example, method 300 may be performed by computing system 900 described below with respect to FIG. 9.

Furthermore, while the present disclosure primarily describes a scenario in which depth information compression is performed by a server that is cooperatively rendering virtual objects with a remote device, such as an HMD, this is not limiting. Rather, method 300 may be implemented in any scenario in which one device is transmitting depth information for one or more virtual objects to one or more other devices for any suitable purpose.

At 302, method 300 includes recognizing a 3D virtual scene including one or more locally-maintained virtual objects. With regard to method 300, the terms "local" and "remote" are used relative to the device performing steps of method 300. Using the example of FIG. 1, method 300 is performed by the server that generates virtual objects 112 and 114. Thus, such objects are referred to as "locally-maintained" virtual objects, as they are local with respect to the server, while virtual object 110 may be referred to as a "remotely-maintained" virtual object, as HMD 102 is a remote device from the server's perspective.

The term "3D virtual scene" refers to any three-dimensional space including one or more virtual objects having defined 3D positions relative to the space. Thus, a 3D virtual scene may correspond to a real-world environment, with virtual objects displayed such that they appear to occupy positions within the real-world environment. Alternatively, a 3D virtual scene may be entirely virtual, having no inherent relationship with an actual real-world space. "Recognizing" such a 3D virtual scene may correspond to any suitable computer operation. Data defining the scene (e.g., dimensions of the scene, a coordinate system mapped to the 3D space, the types and appearances of objects within the scene, virtual object positions relative to the coordinate system) may be generated on-the-fly, loaded into memory from storage, received from another computing device, and/or "recognized" in any other suitable way.

Furthermore, the positions of virtual objects in the 3D virtual scene may be defined in any suitable way. Typically, these positions will be defined relative to a coordinate system that is shared between each different device rendering virtual objects for inclusion in the 3D virtual scene. Such a coordinate system may be "world-locked," meaning the coordinate system is defined relative to a real-world environment (e.g., of a computing device displaying the 3D virtual scene). As other examples, however, the coordinate system may be locked to a perspective of a computing device (e.g., the directions of X, Y, and Z axes may change as the pose of the device changes), and/or use another suitable frame of reference. Furthermore, individual virtual objects may maintain any suitable relationship with regard to their 3D surroundings. For instance, one or more virtual objects may be "world-locked," such that they appear to maintain persistent positions in the virtual space even as the perspective of an observer changes, and/or one or more virtual objects may be "body-locked," in that the apparent positions of the virtual objects change with the perspective of the observer.

FIG. 2B shows an example of one particular view of a 3D virtual scene maintained by the computing device, in which locally-maintained (relative to the device implementing method 300) virtual objects 112 and 114 have discrete 3D positions relative to one another and to a surrounding 3D space (e.g., real-world environment 104 of FIG. 1). Likewise, FIG. 4 schematically shows an example computing device 400 maintaining a 3D virtual scene 402A. 3D virtual scene 402A in turn includes one or more locally-maintained virtual objects 404A.

Returning briefly to FIG. 3, at 304, method 300 includes receiving positioning information for one or more remotely-maintained virtual objects to be included in the 3D virtual scene. To use the example of FIG. 1, virtual object 110 is a remotely-maintained virtual object from the perspective of the server that maintains virtual objects 112 and 114. Thus, HMD 102 may transmit some information regarding the position of virtual object 110 to the server. As will be described in more detail below, the server may then use this positioning information to generate a depth-compressed representation of a virtual view of the 3D virtual scene that includes information regarding occlusion relationships between virtual objects 110, 112, and 114. Such a depth-compressed representation may be transmitted back to the HMD and used to generate the view shown in FIG. 1.

Figure 4:
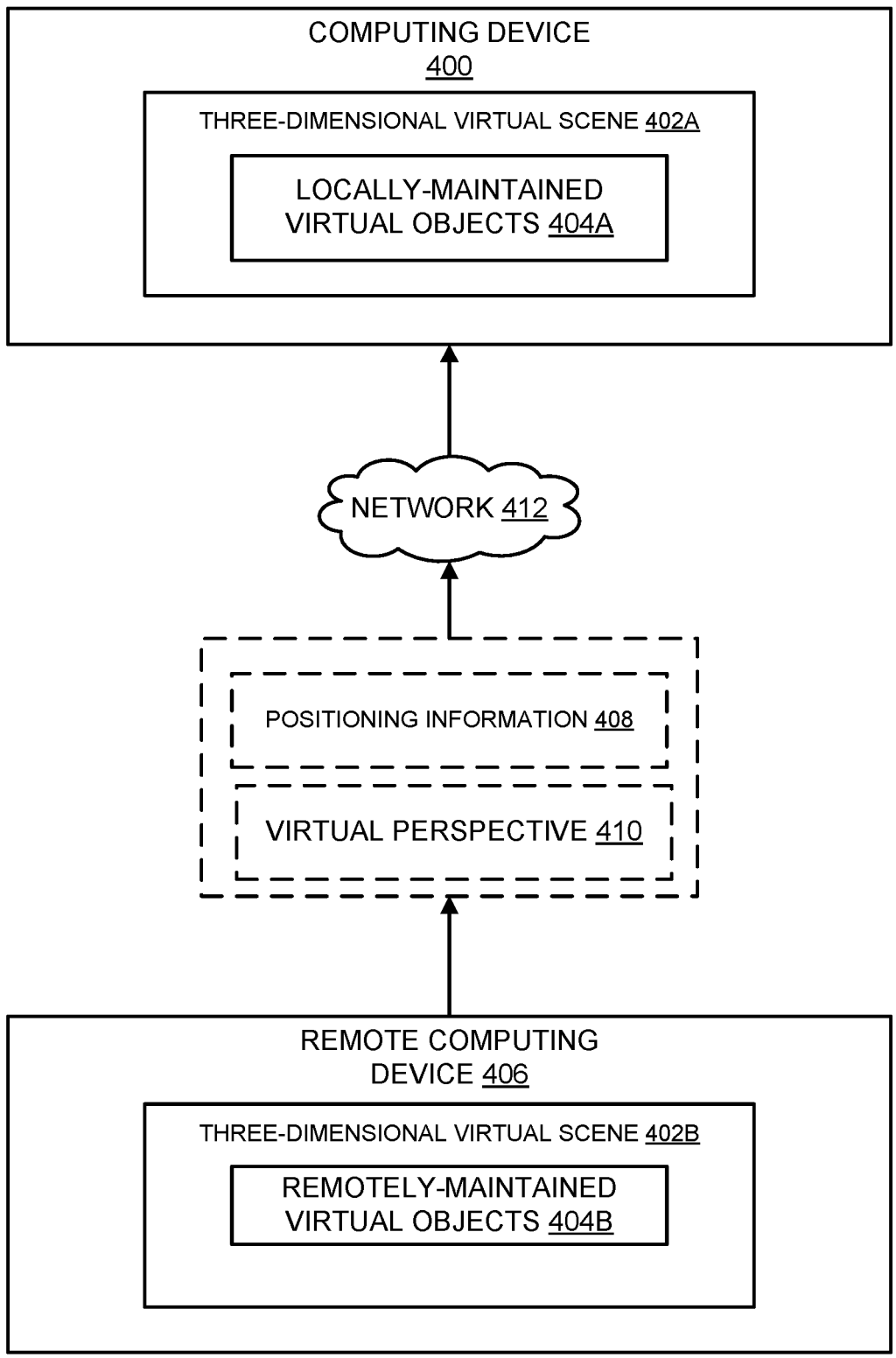
FIG. 4 schematically shows communication between a computing device and remote computing device over a network.

This is also shown in FIG. 4, which schematically shows a remote computing device 406 (e.g., HMD 102) maintaining its own instance 402B of the 3D virtual scene, which in turn includes one or more remotely-maintained virtual objects 404B (e.g., virtual object 110 of FIG. 1). Furthermore, remote device 406 transmits positioning information 408 for the one or more remotely-maintained virtual objects to computing device 400 via a network 412. Network 412 may be any suitable computer network, including local networks and wide-area networks, and may include the Internet.

The positioning information for the one or more remotely-maintained virtual objects may take any suitable form. In one example, the positioning information may include, for each remotely-maintained virtual object, spatial coordinates and bounding box dimensions in a coordinate system of the 3D virtual scene shared between the computing device and remote computing device. As discussed above, in some cases, the shared coordinate system may be world-locked relative to a real-world environment of the remote device, although the shared coordinate system may use any suitable frame-of-reference. Using the example of FIG. 1, HMD 102 may transmit positioning information for virtual object 110 that specifies the position of virtual object 110 (e.g., relative to real-world environment 104, HMD 102, or another suitable reference), as well as dimensions of a bounding box that encloses virtual object 110.

As another example, the positioning information for the one or more remotely-maintained virtual objects may include a depth image generated by the remote device that represents the one or more remotely-maintained virtual objects in the three-dimensional virtual scene from a virtual perspective. For instance, given a particular view of the three-dimensional virtual scene maintained by the remote device, in which the one or more remotely-maintained virtual objects are visible, the remote device may generate a depth image including a plurality of pixels. Each pixel may in turn include a depth value that indicates how far away any content (e.g., remotely-maintained virtual objects) depicted in that pixel is from the virtual viewpoint. Such a depth image may optionally be compressed in any suitable way—for instance to reduce the amount of data used to encode each pixel depth value in the depth image.

In FIG. 4, remote device 406 also transmits a virtual perspective 410 to computing device 400. Because the occlusion relationships between various virtual objects in a 3D virtual scene will typically depend on the perspective of the observer (e.g., an object may occlude a different object from one viewpoint but not another), the remote device may optionally transmit a virtual perspective to the computing device, which may be used to generate the depth-compressed virtual view of the 3D virtual scene. Typically, the virtual perspective will correspond to a perspective from which the 3D virtual scene will be viewed by an observer. For instance, in the example of FIG. 1, the virtual perspective may correspond to the perspective from which user 100 is viewing the virtual objects. In general, however, the virtual perspective may be provided to the computing device at any suitable time and in any suitable way, and the virtual perspective need not be transmitted along with the positioning information for the remotely-maintained virtual objects, as is the case in FIG. 4.

Based on the positioning information for the one or more remotely-maintained virtual objects, the computing device may generate a virtual view of the 3D virtual scene (e.g., from the virtual perspective received from the remote device) that captures occlusion relationships between virtual objects in the 3D virtual scene. In other words, once the positions of the one or more remotely-maintained virtual objects are known relative to the locally-maintained virtual objects, the computing device may determine, from the virtual perspective, which virtual objects occlude which other virtual objects.

Figure 5A:
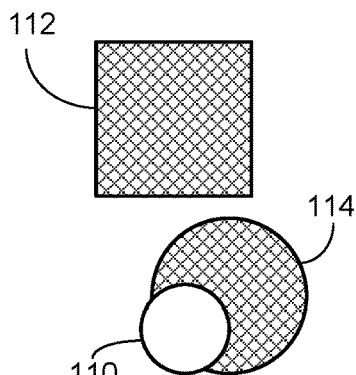
FIGS. 5A-5C illustrate virtual views of a three-dimensional virtual scene.
Figure 5B:
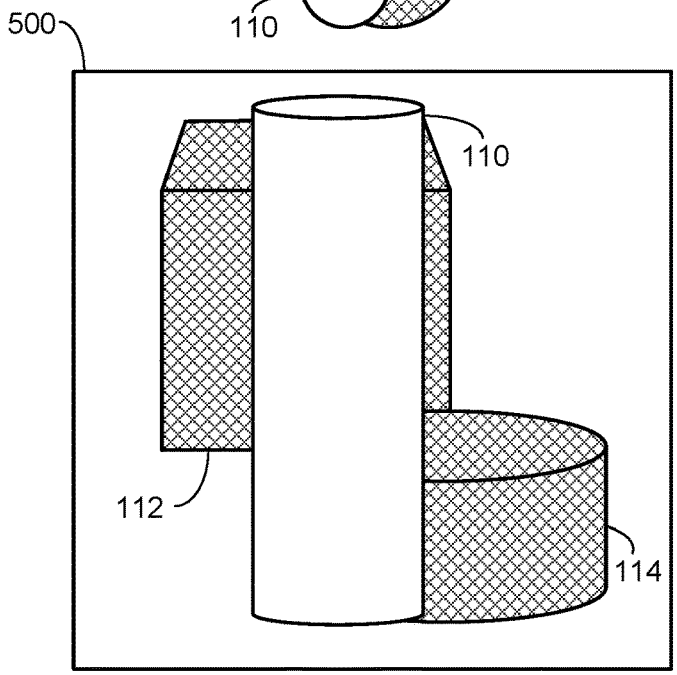
Figure 5C:
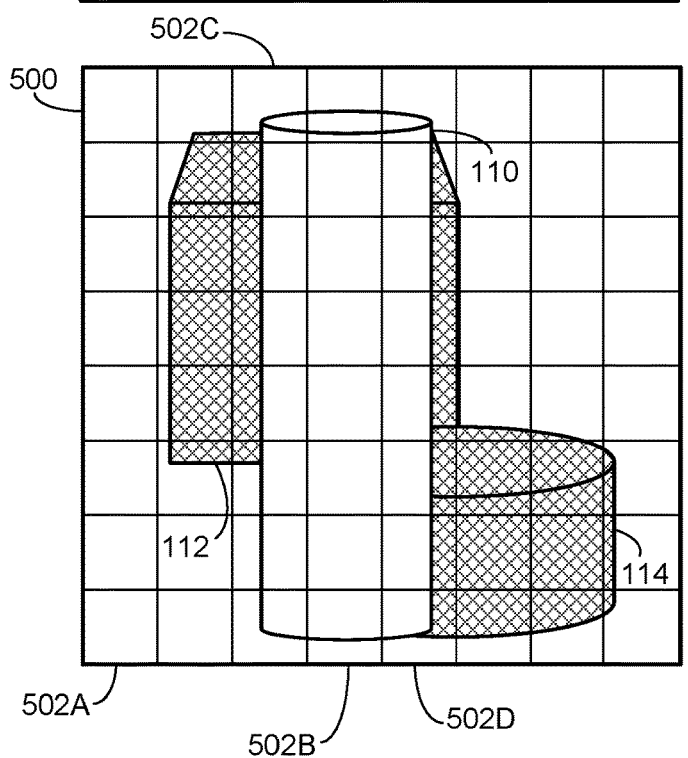

This is illustrated in FIGS. 5A-5C. Specifically, FIG. 5A shows an overhead view of a 3D virtual scene, in which computing device 400 has placed virtual object 110 at a position relative to virtual objects 112 and 114 given by the positioning information provided by the remote device. Specifically, virtual object 110 is in front of virtual object 112 and partially intersecting with virtual object 114.

FIG. 5B shows a virtual view 500 of the 3D virtual scene from the virtual perspective specified by the remote device. As discussed above, in some cases the virtual perspective may correspond to a perspective from which the 3D virtual scene will ultimately be viewed by a user (e.g., user 100 of FIG. 1). From the virtual perspective, portions of virtual objects 112 and 114 are occluded by virtual object 110.

In FIG. 5C, virtual view 500 has been divided into a plurality of different portions, including portions 502A-502D. As will be discussed in more detail below, each of portions 502A-502D is representative of a different occlusion relationship between the locally and remotely-maintained virtual objects. In some examples, the virtual view may be divided into a plurality of non-overlapping tiles each including a contiguous plurality of pixels. As used herein, each "portion" of a virtual view may correspond to such non-overlapping tiles, or another suitable subdivision of a virtual view of a 3D scene. The size of a tile or other portion (e.g., the number of contiguous pixels) may be set to any desired size (e.g., a 100 pixel by 100 pixel tile).

Returning briefly to FIG. 3, at 306, method 300 includes, for a virtual view of the 3D virtual scene having a virtual perspective, classifying different portions of the virtual view as belonging to one of a plurality of different occlusion classes. Each different occlusion class specifies an occlusion relationship between locally-maintained virtual objects and remotely-maintained virtual objects in the virtual view.

Figure 6:
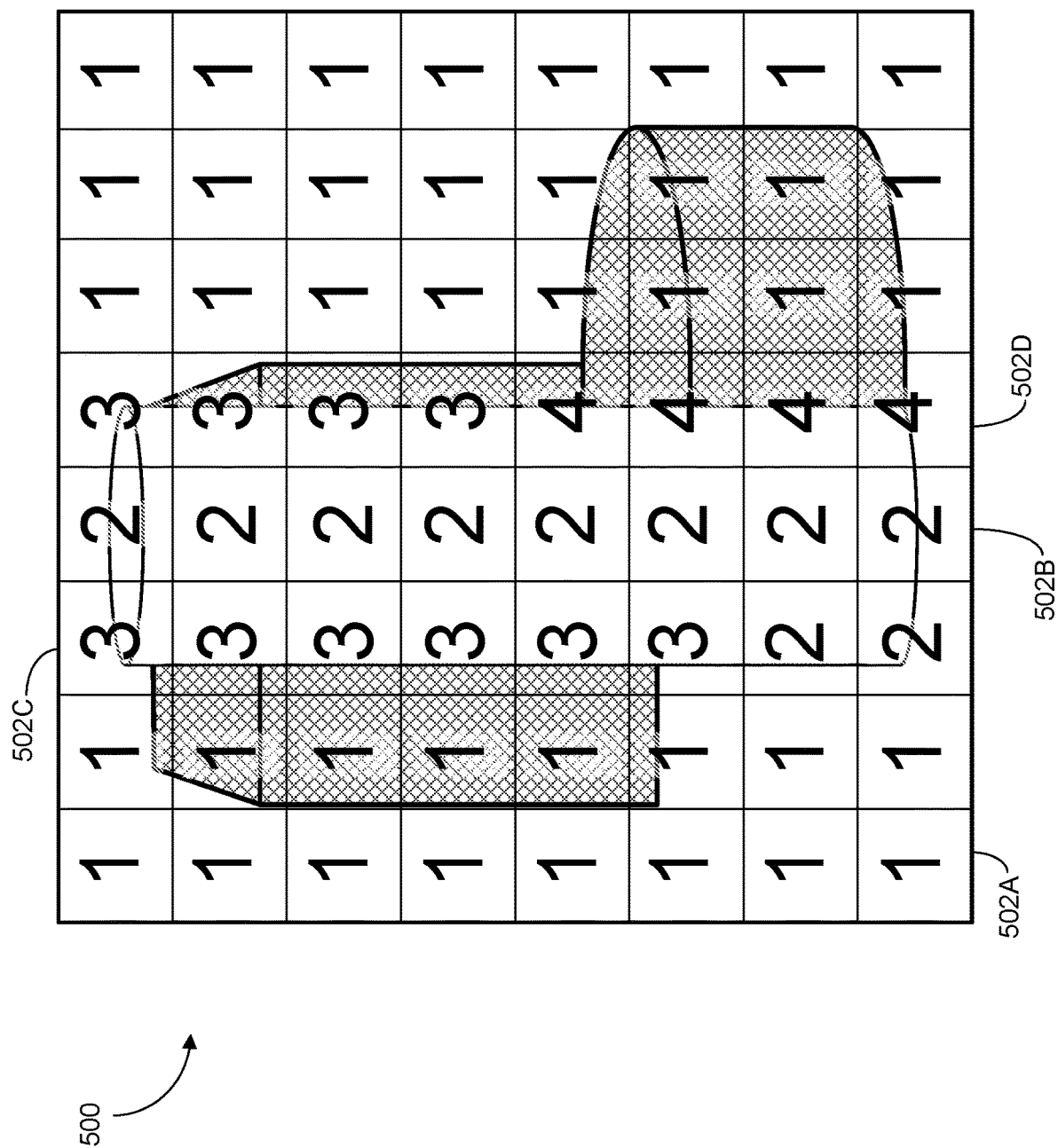
FIG. 6 schematically illustrates classifying different portions of a virtual view as belonging to different occlusion classes.

This is illustrated in FIG. 6, which again shows virtual view 500 of FIG. 5C divided into a plurality of different portions. However, in FIG. 6, each different portion of the virtual view is labeled with numerals 1-4 to indicate the occlusion class that portion of the virtual view belongs to. Any suitable number and variety of different occlusion classes may be used. In one example, the computing device may maintain at least four different occlusion classes, including a no-occlusion class, a full-occlusion class, a partial-occlusion class, and an intersection class.

Portion 502A of virtual view 500, as well as other portions of the virtual view labeled with a numeral "1," belong to the no-occlusion class. The no-occlusion class specifies an occlusion relationship in which a locally-maintained virtual object is either not present or not occluded by one or more remotely-maintained virtual objects. In the specific case of portion 502A, no locally-maintained virtual content is present (i.e., no parts of virtual objects 112 or 114 are visible in portion 502A). However, even portions of the virtual view in which virtual objects 112 and/or 114 are visible may belong to the no-occlusion class if there is no occlusion between the locally-rendered virtual objects and one or more remotely-rendered virtual objects (e.g., virtual object 110).

By contrast, portion 502B of virtual view 500, as well as other portions of the virtual view labeled with a numeral "2," belong to the full-occlusion class. The full-occlusion class specifies an occlusion relationship in which a locally-maintained virtual object is fully occluded by one or more remotely-maintained virtual objects. Specifically, in portion 502B, part of virtual object 114 would ordinarily be visible (as can be seen in FIG. 2B), although that part of virtual object 114 is instead completely occluded by virtual object 110 in virtual view 500.

Similarly, portion 502C of virtual view 500, as well as other portions of the virtual view labeled with a numeral "3," belong to the partial-occlusion class. The partial-occlusion class specifies an occlusion relationship in which a locally-maintained object is partially occluded by one or more remotely-rendered virtual objects. Specifically, in portion 502C, virtual object 110 is occluding virtual object 112, although only partially, as a part of virtual object 112 is still visible.

Finally, portion 502D of virtual view 500, as well as other portions of the virtual view labeled with a numeral "4," belong to the intersection class. The intersection class specifies an occlusion relationship in which a locally-maintained virtual object intersects with (e.g., touches, overlaps with) a remotely-maintained virtual object. Specifically, in portion 502D, virtual object 114 is intersecting with virtual object 110 (as is shown in FIG. 5A).

It will be understood that the specific occlusion classes described herein are not limiting. Rather, any suitable number of different occlusion classes may be used to describe any number of different occlusion relationships that are possible between two or more virtual objects in a 3D virtual scene. Furthermore, each of the different occlusion classes specifically described herein are all present in virtual view 500, although this will not always necessarily be the case. In other words, a virtual view of a 3D virtual scene need not exhibit each and every type of occlusion relationship described herein, and/or may exhibit occlusion relationships not specifically described herein.

Returning briefly to FIG. 3, at 308, method 300 includes outputting a depth-compressed representation of the virtual view to the remote device. The depth-compressed representation indicates, for each of the different portions of the virtual view, the occlusion classes for the different portions. In other words, at a high level, the depth-compressed relationship indicates to the remote device which portions of the virtual view feature occlusions between locally and remotely-maintained virtual objects, and the nature of such occlusions.

From a technical standpoint, the depth-compressed representation may take the form of a matrix, array, or other data structure that defines, for each of a plurality of portions of the virtual view (e.g., tiles, pixels, or other subdivisions), the occlusion class for that portion. For instance, the occlusion class for each of the different portions of the virtual view may be indicated in the depth-compressed representation using a different unique indicator for each of the plurality of different occlusion classes. In other words, a first unique indicator may refer to portions belonging to the no-occlusion class, while second, third, and fourth unique indicators refer to the full-occlusion, partial-occlusion, and intersection classes.

Figure 7:
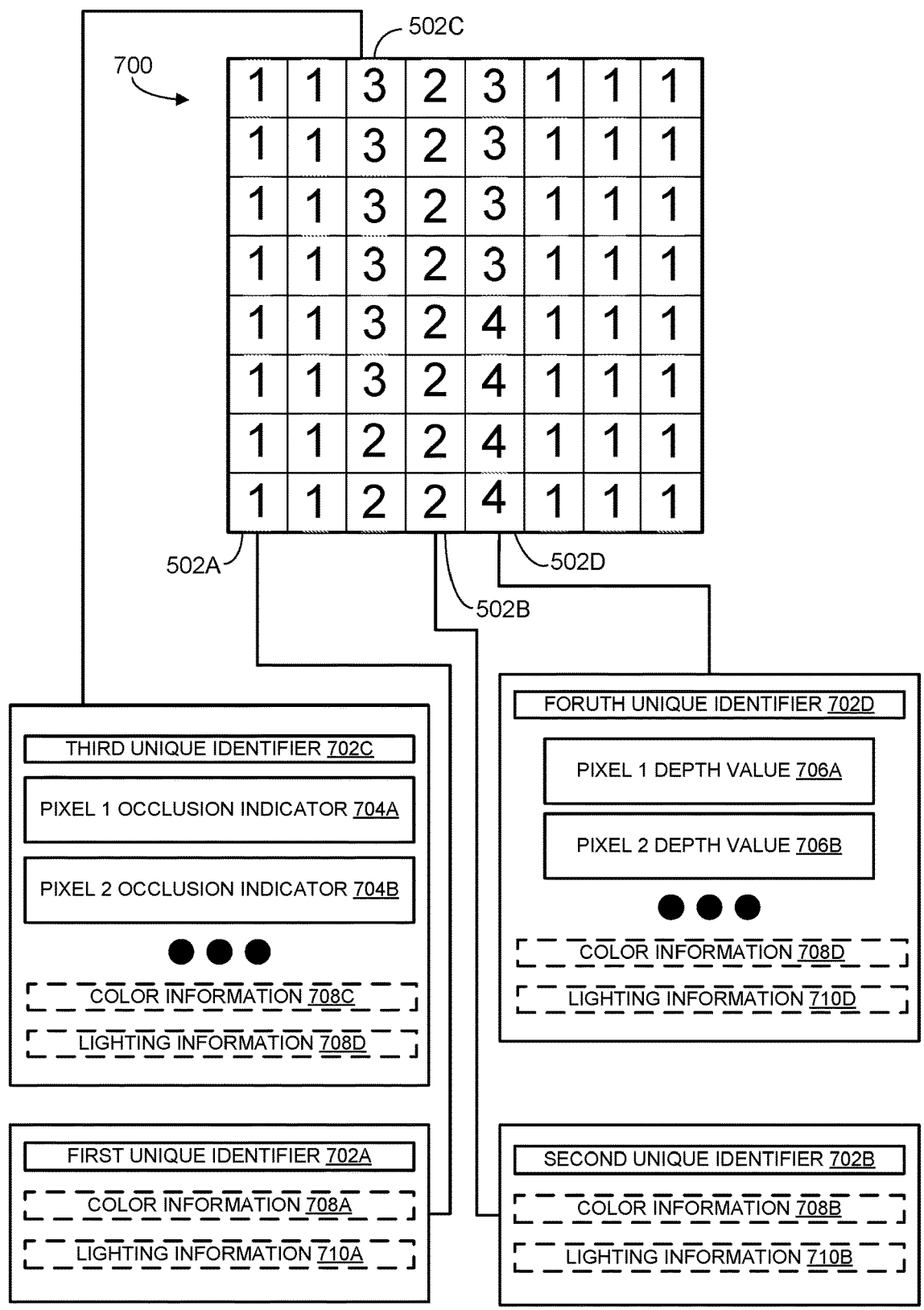
FIG. 7 schematically shows an example depth-compressed representation of a virtual view of a three-dimensional virtual scene.

This is schematically shown in FIG. 7, which shows an example depth-compressed representation 700. Representation 700 indicates, for each portion of the virtual view, the occlusion class for that portion. Specifically, no-occlusion portions (including portion 502) are indicated using a first unique identifier 70A, while full-occlusion, partial-occlusion, and intersection portions are indicated using second, third, and fourth unique indicators 702B-D. In one example, each different indicator may be implemented as a 2-bit value (i.e., 00, 01, 10, and 11), although the unique indicators may take any suitable form depending on the implementation and number of occlusion classes represented.

Furthermore, the depth-compressed representation may include variable amounts of information for each portion of the virtual view depending on the occlusion class to which each portion belongs. For instance, with regard to portions of the virtual view that exhibit relatively simple occlusion relationships, it may not be necessary for the depth-compressed representation to provide much, if any, information other than the occlusion classes for the different portions. As one example, in portions of the virtual view belonging to the full-occlusion class, all locally-maintained virtual objects that would ordinarily be visible in such portions are completely occluded by remotely-maintained virtual objects. Thus, the detailed depth information associated with such portions may not be needed by the remote device. Rather, the depth-compressed representation may simply specify that such portions belong to the full-occlusion class. From this, the remote device may infer that display pixels corresponding to the full-occlusion portions of the virtual view may be rendered with pixel color values corresponding to the remotely-maintained virtual objects (e.g., virtual object 110), without having to perform more complicated pixel-by-pixel occlusion calculations.

Similarly, in portions of the virtual view belonging to the no-occlusion class, either no locally-maintained content is present, or such content is not occluded by remotely-maintained virtual objects. Thus, the detailed depth information associated with such portions once again may not be needed. Rather, the remote device may render display pixels corresponding to no-occlusion portions of the virtual view with color values appropriate to any locally or remotely-maintained virtual objects depicted by the display pixels, again without needing to evaluate pixel-by-pixel occlusion relationships.

By contrast, partial-occlusion and intersection portions of the virtual view represent more complicated cases. As such, the depth-compressed representation may specify additional information for each partial-occlusion and intersection portion of the virtual view. With specific regard to portions belonging to the partial-occlusion class, the depth-compressed representation of the virtual view may include a pixel occlusion indicator for each of a plurality of pixels in the portion. The pixel occlusion indicator may specify, for each of the plurality of pixels in the portion, whether the pixel is occluded by a remotely-maintained virtual object. This is illustrated in FIG. 7, as depth-compressed representation 700 includes pixel occlusion indicators 704A and 704B, as well as other pixel occlusion indicators not shown in FIG. 7, for partial-occlusion portion 502C. The pixel occlusion indicators may take any suitable form, and in some cases may be expressed as 1-byte values (i.e., the pixel either is or is not occluded).

Similarly, with specific regard to intersection portions of the virtual view, the depth-compressed representation may include a pixel depth value for each of a plurality of pixels in the portion. The pixel depth values may specify with relative precision the depth of any virtual content depicted by the pixel relative to the virtual perspective. With such information, the remote device may calculate, for each pixel in each intersection portion of the virtual view, whether a remotely-maintained or locally-maintained virtual object would be visible from the virtual perspective. This is also shown in FIG. 7, as depth-compressed representation 700 includes pixel depth values 706A and 706B, as well as other pixel depth values not shown in FIG. 7, for intersection portion 502D. The pixel depth values may take any suitable form, and in some cases may be expressed as 16-byte values.

The present disclosure has thus far focused on specifying occlusion relationships between locally and remotely-maintained virtual objects. Additionally, however, the computing device may in some cases provide information to the remote device regarding the visual appearance of the locally-maintained virtual objects. For instance, for each of a plurality of pixels in the depth-compressed representation of the virtual view corresponding to the one or more locally-maintained virtual objects, the computing device may output color and/or lighting information for the plurality of pixels. Such information may be included in the depth-compressed representation, or be transmitted as part of a different data structure. For instance, in FIG. 7, the depth-compressed representation includes color information 708A-D and lighting information 710A-D for each of the plurality of portions of the virtual view. Such color and/or lighting information may take any suitable form, and may optionally be compressed or encoded in any suitable way.

Figure 8:
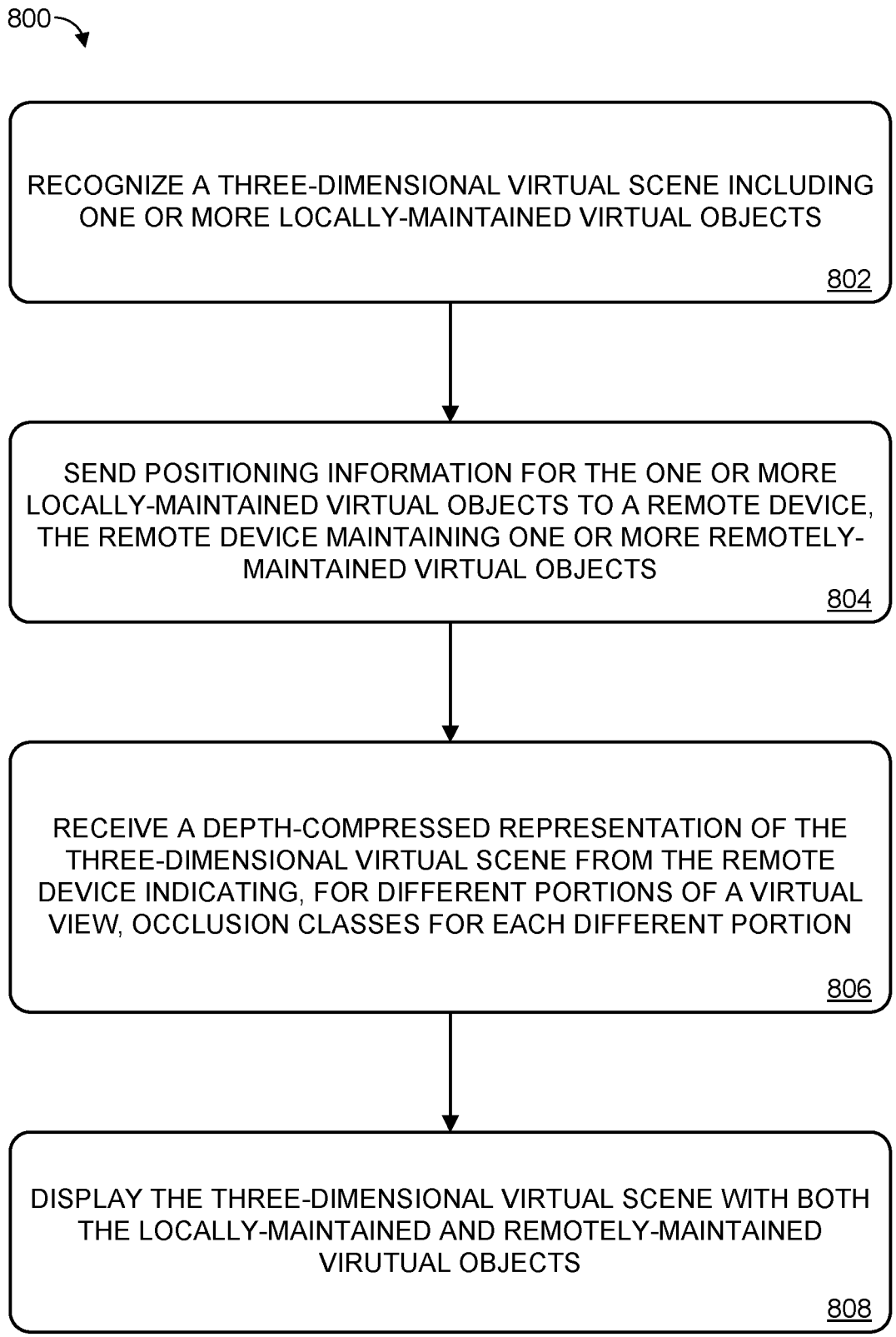
FIG. 8 illustrates an example method for rendering a display view of a three-dimensional virtual scene.

Turning now to FIG. 8, once the depth-compressed representation is received by the remote device, the remote device may use the depth-compressed representation to render a display view of the 3D virtual scene. Accordingly, FIG. 8 illustrates an example method 800 for rendering a display view. In some scenarios, method 800 is performed by a virtual or augmented reality display device, but method 800 may be implemented on any suitable computing device having a sufficient hardware configuration regardless of form factor. As one example, method 800 may be implemented on computing system 900 described below with respect to FIG. 9.

At 802, method 800 includes recognizing a 3D virtual scene including one or more locally-maintained virtual objects. In this example, the method is being performed by the device referred to as the "remote device" with respect to FIG. 3. Using the example of FIG. 1, method 800 may be performed by HMD 102. Thus, with respect to method 800, virtual object 110 of FIG. 1 would be referred to as a "locally-maintained" virtual object, while virtual objects 112 and 114 are "remotely-maintained," as they are maintained by a device (e.g., server) that is remote from the perspective of HMD 102. Regardless, a 3D virtual scene may be "recognized" in any suitable way as discussed above with respect to method 300, including generating the 3D virtual scene on-the-fly, loading parameters describing the scene from storage, receiving such parameters from another device, etc.

At 804, method 800 includes sending positioning information for the one or more locally-maintained virtual objects to a remote device. The remote device maintains one or more remotely-maintained virtual objects. As discussed above, such positioning information may be used by the remote device (e.g., computing device 400 of FIG. 4) to generate a virtual view of the 3D virtual scene in which the locally and remotely-maintained virtual objects have spatial relationships consistent with the positioning information. The remote device may then classify a plurality of different portions of the virtual view as belonging to a plurality of different occlusion classes, and generate a depth-compressed representation of the virtual view specifying such occlusion classes.

Continuing with FIG. 8, at 806, method 800 includes receiving a depth-compressed representation of the 3D virtual scene from the remote device indicating, for different portions of a virtual view of the 3D virtual scene having a virtual perspective, occlusion classes for each different portion. As discussed above, the virtual perspective will typically correspond to a perspective from which the 3D virtual scene will be seen by an observer (e.g., user 100 of FIG. 1). Furthermore, the depth-compressed representation may include any number and variety of occlusion classes that in turn specify any suitable occlusion relationships, including as examples, a no-occlusion class, full-occlusion class, partial-occlusion class, and intersection class. Depending on the occlusion class, the depth-compressed representation may include variable amounts of information for each portion of the virtual view, including, as examples, pixel occlusion indicators for partial-occlusion portions, and/or pixel depth values for intersection portions.

At 808, method 800 includes, based on the depth-compressed representation, displaying at the computing device from the virtual perspective, the 3D virtual scene including both the locally-maintained and remotely-maintained virtual objects. In other words, the 3D virtual scene may be displayed as a rendered image on a computer display (e.g., near-eye display 106 of HMD 102), such that the 3D virtual scene can be observed by a human user. As discussed above, rendering the 3D virtual scene may include, for each portion of the virtual view, determining whether locally or remotely-maintained virtual objects would be visible from the virtual perspective at each portion based on the occlusion class that each portion belongs to. Based on such occlusion relationships, the computing device may render display pixels with color values that correspond to any locally or remotely-maintained virtual objects corresponding to such display pixels.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
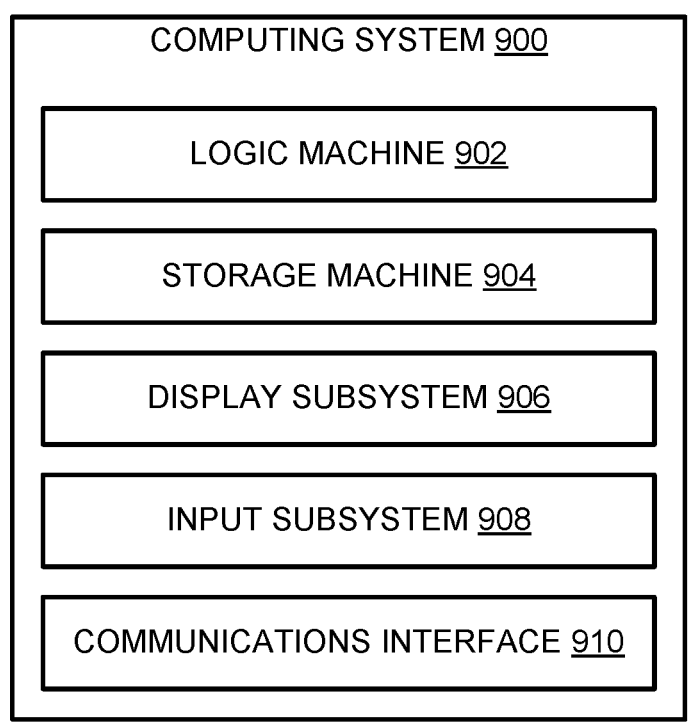
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, game controller, position and/or orientation sensors (e.g., of an HMD), etc. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for compressing depth information for a three-dimensional virtual scene comprises: at a computing device, recognizing a three-dimensional virtual scene including one or more locally-maintained virtual objects; receiving, from a remote device, positioning information for one or more remotely-maintained virtual objects to be included in the three-dimensional virtual scene; for a virtual view of the three-dimensional virtual scene having a virtual perspective, classifying different portions of the virtual view as belonging to one of a plurality of different occlusion classes, each of the plurality of different occlusion classes specifying an occlusion relationship between locally-maintained virtual objects and remotely-maintained virtual objects in the virtual view; and outputting a depth-compressed representation of the virtual view to the remote device, the depth-compressed representation indicating the occlusion class for each of the different portions of the virtual view. In this example or any other example, the method further comprises receiving the virtual perspective from the remote device. In this example or any other example, the plurality of different occlusion classes includes a no-occlusion class, the no-occlusion class specifying an occlusion relationship in which a locally-maintained virtual object is either not present or not occluded by one or more remotely-maintained virtual objects. In this example or any other example, the plurality of different occlusion classes includes a full-occlusion class, the full-occlusion class specifying an occlusion relationship in which a locally-maintained virtual object is fully occluded by one or more remotely-maintained virtual objects. In this example or any other example, the plurality of different occlusion classes includes a partial-occlusion class, the partial-occlusion class specifying an occlusion relationship in which a locally-maintained virtual object is partially occluded by one or more remotely-maintained virtual objects. In this example or any other example, the depth-compressed representation of the virtual view includes, for each different portion of the virtual view belonging to the partial-occlusion class, a pixel occlusion indicator for each of a plurality of pixels in the portion, the pixel occlusion indicator specifying whether the pixel is occluded by a remotely-maintained virtual object. In this example or any other example, the plurality of different occlusion classes includes an intersection class, the intersection class specifying an occlusion relationship in which a locally-maintained virtual object intersects with a remotely-maintained virtual object. In this example or any other example, the depth-compressed representation includes, for each different portion of the virtual view belonging to the intersection class, a pixel depth value for each of a plurality of pixels in the portion. In this example or any other example, the pixel depth value is a 16-bit value. In this example or any other example, the occlusion class for each of the different portions of the virtual view is indicated in the depth-compressed representation using a different unique indicator for each of the plurality of different occlusion classes. In this example or any other example, each different unique indicator is a 2-bit value. In this example or any other example, the positioning information for the one or more remotely-maintained virtual objects includes, for each remotely-maintained virtual object, spatial coordinates and bounding box dimensions in a coordinate system of the three-dimensional virtual scene shared between the computing device and the remote device. In this example or any other example, the coordinate system is world-locked relative to a real-world environment of the remote device. In this example or any other example, the positioning information for the one or more remotely-maintained virtual objects includes a depth image generated by the remote device that represents the one or more remotely-maintained virtual objects in the three-dimensional virtual scene from the virtual perspective. In this example or any other example, the method further comprises dividing the virtual view of the three-dimensional virtual scene into a plurality of non-overlapping tiles including a contiguous plurality of pixels, and where each different portion of the virtual view is a different non-overlapping tile. In this example or any other example, the method further comprises, for each of a plurality of pixels in the depth-compressed representation of the virtual view corresponding to the one or more locally-maintained virtual objects, outputting color information for the plurality of pixels. In this example or any other example, the method further comprises, for each of a plurality of pixels in the depth-compressed representation of the virtual view corresponding to the one or more locally-maintained virtual objects, outputting lighting information for the plurality of pixels.

In an example, a computing device comprises: a logic machine; and a storage machine holding instructions executable by the logic machine to: recognize a three-dimensional virtual scene including one or more locally-maintained virtual objects; receive, from a remote device, positioning information for one or more remotely-maintained virtual objects to be included in the three-dimensional virtual scene; for a virtual view of the three-dimensional virtual scene having a virtual perspective, classify different portions of the virtual view as belonging to one of a plurality of different occlusion classes, each of the plurality of different occlusion classes specifying an occlusion relationship between locally-maintained virtual objects and remotely-maintained virtual objects in the virtual view; and output a depth-compressed representation of the virtual view to the remote device, the depth-compressed representation indicating the occlusion class for each of the different portions of the virtual view.

In an example, a method for rendering a display view of a three-dimensional virtual scene comprises: at a computing device, recognizing a three-dimensional virtual scene including one or more locally-maintained virtual objects; sending positioning information for the one or more locally-maintained virtual objects to a remote device, the remote device maintaining one or more remotely-maintained virtual objects to be included in the three-dimensional virtual scene; receiving a depth-compressed representation of the three-dimensional virtual scene from the remote device, the depth-compressed representation indicating, for different portions of a virtual view of the three-dimensional virtual scene having a virtual perspective, which of a plurality of different occlusion classes the different portions belong to, each of the plurality of different occlusion classes specifying an occlusion relationship between locally-maintained virtual objects and remotely-maintained virtual objects in the virtual view; and based on the depth-compressed representation, displaying at the computing device from the virtual perspective, the three-dimensional virtual scene with both the locally-maintained and remotely-maintained virtual objects. In this example or any other example, the computing device is a head-mounted display device (HMD).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for compressing depth information for a three-dimensional virtual scene, comprising:
at a computing device, recognizing a three-dimensional virtual scene including one or more locally-maintained virtual objects;
receiving, from a remote device, positioning information for one or more remotely-maintained virtual objects to be included in the three-dimensional virtual scene;
for a virtual view of the three-dimensional virtual scene having a virtual perspective, classifying different portions of the virtual view as belonging to one of a plurality of different occlusion classes, each of the plurality of different occlusion classes specifying an occlusion relationship between locally-maintained virtual objects and remotely-maintained virtual objects in the virtual view; and
outputting a depth-compressed representation of the virtual view to the remote device, the depth-compressed representation indicating the occlusion class for each of the different portions of the virtual view.

2. The method of claim 1, further comprising receiving the virtual perspective from the remote device.

3. The method of claim 1, where the plurality of different occlusion classes includes a no-occlusion class, the no-occlusion class specifying an occlusion relationship in which a locally-maintained virtual object is either not present or not occluded by one or more remotely-maintained virtual objects.

4. The method of claim 1, where the plurality of different occlusion classes includes a full-occlusion class, the full-occlusion class specifying an occlusion relationship in which a locally-maintained virtual object is fully occluded by one or more remotely-maintained virtual objects.

5. The method of claim 1, where the plurality of different occlusion classes includes a partial-occlusion class, the partial-occlusion class specifying an occlusion relationship in which a locally-maintained virtual object is partially occluded by one or more remotely-maintained virtual objects.

6. The method of claim 5, where the depth-compressed representation of the virtual view includes, for each different portion of the virtual view belonging to the partial-occlusion class, a pixel occlusion indicator for each of a plurality of pixels in the portion, the pixel occlusion indicator specifying whether the pixel is occluded by a remotely-maintained virtual object.

7. The method of claim 1, where the plurality of different occlusion classes includes an intersection class, the intersection class specifying an occlusion relationship in which a locally-maintained virtual object intersects with a remotely-maintained virtual object.

8. The method of claim 7, where the depth-compressed representation includes, for each different portion of the virtual view belonging to the intersection class, a pixel depth value for each of a plurality of pixels in the portion.

9. The method of claim 8, where the pixel depth value is a 16-bit value.

10. The method of claim 1, where the occlusion class for each of the different portions of the virtual view is indicated in the depth-compressed representation using a different unique indicator for each of the plurality of different occlusion classes.

11. The method of claim 10, where each different unique indicator is a 2-bit value.

12. The method of claim 1, where the positioning information for the one or more remotely-maintained virtual objects includes, for each remotely-maintained virtual object, spatial coordinates and bounding box dimensions in a coordinate system of the three-dimensional virtual scene shared between the computing device and the remote device.

13. The method of claim 12, where the coordinate system is world-locked relative to a real-world environment of the remote device.

14. The method of claim 1, where the positioning information for the one or more remotely-maintained virtual objects includes a depth image generated by the remote device that represents the one or more remotely-maintained virtual objects in the three-dimensional virtual scene from the virtual perspective.

15. The method of claim 1, further comprising dividing the virtual view of the three-dimensional virtual scene into a plurality of non-overlapping tiles including a contiguous plurality of pixels, and where each different portion of the virtual view is a different non-overlapping tile.

16. The method of claim 1, further comprising, for each of a plurality of pixels in the depth-compressed representation of the virtual view corresponding to the one or more locally-maintained virtual objects, outputting color information for the plurality of pixels.

17. The method of claim 1, further comprising, for each of a plurality of pixels in the depth-compressed representation of the virtual view corresponding to the one or more locally-maintained virtual objects, outputting lighting information for the plurality of pixels.

18. A computing device, comprising:
a logic machine; and
a storage machine holding instructions executable by the logic machine to:
recognize a three-dimensional virtual scene including one or more locally-maintained virtual objects;

receive, from a remote device, positioning information for one or more remotely-maintained virtual objects to be included in the three-dimensional virtual scene;

for a virtual view of the three-dimensional virtual scene having a virtual perspective, classify different portions of the virtual view as belonging to one of a plurality of different occlusion classes, each of the plurality of different occlusion classes specifying an occlusion relationship between locally-maintained virtual objects and remotely-maintained virtual objects in the virtual view; and output a depth-compressed representation of the virtual view to the remote device, the depth-compressed representation indicating the occlusion class for each of the different portions of the virtual view.

19. A method for rendering a display view of a three-dimensional virtual scene, the method comprising:

at a computing device, recognizing a three-dimensional virtual scene including one or more locally-maintained virtual objects;

sending positioning information for the one or more locally-maintained virtual objects to a remote device, the remote device maintaining one or more remotely-maintained virtual objects to be included in the three-dimensional virtual scene;

receiving a depth-compressed representation of the three-dimensional virtual scene from the remote device, the depth-compressed representation indicating, for different portions of a virtual view of the three-dimensional virtual scene having a virtual perspective, which of a plurality of different occlusion classes the different portions belong to, each of the plurality of different occlusion classes specifying an occlusion relationship between locally-maintained virtual objects and remotely-maintained virtual objects in the virtual view; and based on the depth-compressed representation, displaying at the computing device from the virtual perspective, the three-dimensional virtual scene with both the locally-maintained and remotely-maintained virtual objects.

20. The method of claim 19, where the computing device is a head-mounted display device (HMD).

* * * * *